United States Patent
Chen et al.

(10) Patent No.: US 9,894,722 B2
(45) Date of Patent: Feb. 13, 2018

(54) DRIVER WITH OPEN OUTPUT PROTECTION

(71) Applicant: PHILIPS LIGHTING HOLDING B.V., Eindhoven (NL)

(72) Inventors: Zhi Quan Chen, Eindhoven (NL); Kang Li, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/034,562

(22) PCT Filed: Oct. 24, 2014

(86) PCT No.: PCT/EP2014/072806
§ 371 (c)(1),
(2) Date: May 5, 2016

(87) PCT Pub. No.: WO2015/067480
PCT Pub. Date: May 14, 2015

(65) Prior Publication Data
US 2017/0196053 A1    Jul. 6, 2017

(30) Foreign Application Priority Data

Nov. 8, 2013   (WO) ................ PCT/CN2013/001354
Jan. 3, 2014   (EP) .................................... 14150098

(51) Int. Cl.
*H05B 33/08*   (2006.01)

(52) U.S. Cl.
CPC ....... *H05B 33/0815* (2013.01); *H05B 33/089* (2013.01)

(58) Field of Classification Search
CPC ............ H05B 33/0815; H05B 33/0887; H05B 33/0809; H05B 33/0821; H05B 33/089;
(Continued)

(56) References Cited

U.S. PATENT DOCUMENTS

| 6,577,509 B2 * | 6/2003 | Deboy .............. H02M 3/33507 363/20 |
| 7,511,437 B2 | 3/2009 | Lys et al. |

(Continued)

FOREIGN PATENT DOCUMENTS

| CN | 102696282 A | 9/2012 |
| CN | 202424157 U | 9/2012 |

(Continued)

*Primary Examiner* — Haissa Philogene
(74) *Attorney, Agent, or Firm* — Meenakshy Chakravorty

(57) ABSTRACT

Driver with open output protection Starting current for a load driver (200; 300) for driving a load (L) is provided via the load. In a load driver (200; 300) for driving a load (L), an operating current or an operating voltage at a reference point is derived from a power voltage bus (105; 305) by coupling said reference point to said power voltage bus via the load. A load driver (200; 300) for driving a load (L) comprises an output capacitor (125; 325) and two output terminals (128, 129; 328, 329) coupled to the output capacitor. A coupling diode (202; 325) is coupled in forward connection from one output terminal to a terminal of the output buffer capacitor. A startup terminal (111) of a converter circuit (110) is coupled to said one output terminal (129; 329) to receive a startup current (Is) via the driven load if the load is present to conduct this current.

13 Claims, 5 Drawing Sheets

(58) Field of Classification Search
CPC .. H02M 1/36; H02M 1/4225; H02M 3/33507; H02M 2001/0006
USPC ....... 315/185, 219, 247, 193, 224, 291, 307, 315/312 R, 312; 363/20, 97, 12.12
See application file for complete search history.

(56) References Cited

U.S. PATENT DOCUMENTS

| | | | |
|---|---|---|---|
| 7,550,934 | B1 | 6/2009 | Deng et al. |
| 8,373,346 | B2 * | 2/2013 | Hoogzaad ............... G09G 3/342 315/185 R |
| 8,963,535 | B1 * | 2/2015 | Melanson ............... G01R 33/07 307/116 |
| 9,282,605 | B2 * | 3/2016 | Lai ..................... H05B 33/0815 |
| 2005/0093488 | A1 | 5/2005 | Hung et al. |
| 2012/0085800 | A1 | 4/2012 | Maimin |
| 2012/0299480 | A1 | 11/2012 | Peting et al. |
| 2012/0299488 | A1 | 11/2012 | Zhang et al. |
| 2013/0049589 | A1 | 2/2013 | Simi |
| 2013/0154482 | A1 | 6/2013 | Ge et al. |
| 2013/0155561 | A1 | 6/2013 | Lai |
| 2016/0119987 | A1 * | 4/2016 | Chen .................. H05B 33/0818 315/224 |

FOREIGN PATENT DOCUMENTS

| | | |
|---|---|---|
| CN | 102869148 A | 1/2013 |
| WO | WO2012085800 A1 | 6/2012 |

* cited by examiner

DRIVER WITH OPEN OUTPUT PROTECTION

CROSS-REFERENCE TO PRIOR APPLICATIONS

This application is the U.S. National Phase application under 35 U.S.C. § 371 of International Application No. PCT/EP2014/072806, filed on Oct. 24, 2014, which claims the benefit of European Application No. 14150098.3, filed Jan. 3, 2014, and Chinese Application No. PCT/CN2013/001354, filed Nov. 8, 2013. These applications are hereby incorporated by reference herein.

FIELD OF THE INVENTION

The present invention relates in general to a switched-mode driver. Particularly, but not explosively, the present invention relates to a switched-mode driver for use as an LED driver.

BACKGROUND OF THE INVENTION

In switched-mode drivers, such as those used for driving an LED, an output buffer capacitor is repeatedly charged and discharged. In case the driven LED is defective to provide an open circuit, or no LED is connected to the output terminals, the voltage over the output buffer capacitor may become very high, and thus the voltage over the output terminals may become very high, which is potentially dangerous and may cause damage to the electronic components. Known protection circuits comprise a relatively large number of components and are hence relatively costly. For example, numerous transistors, stabilivolt, capacitors, etc are used for sensing the voltage of a secondary transformer winding which is indicative of the load voltage. Additionally, the current open protection circuit starts and stops alternatively and results in burping of the driver; re-start again and again.

US2005/0093488 also discloses an IC-based LED driver. The switching of the power switch MOS 461 is controlled by an LED line driver IC 420. A startup of the power switch is handled by the IC, not by a current from the power supply via the load. Such IC-based solution is high cost.

US2005/0093488 also discloses an IC-based driver. But it is a linear driver, not a switching power driver. A transistor is parallel with the load and is used for as a resistive element to shunting a portion of power from the load. Also, the transistor 108 in this prior art controlled by the IC and is not turned on by a startup current coming from the power supply via the load.

SUMMARY OF THE INVENTION

An object of the present invention is to provide a switched-mode driver with overvoltage/open load protection, having a relatively low number of components and having good protection performance.

In one aspect, the present invention provides a method for providing a starting current for a driver for driving a load, the method comprising the step of providing the starting current via the load to be driven.

In another aspect, the present invention provides a method for providing an operating current or an operating voltage at a reference point in a driver for driving load, wherein said operating current or operating voltage, respectively, is derived from a power voltage bus by coupling said reference point to said power voltage bus via the load to be driven.

In yet another aspect, the present invention provides a load driver for driving a load, comprising: an output buffer capacitor; two output terminals coupled to the output buffer capacitor for coupling to the load; a coupling diode coupled in forward connection from a first output terminal to a first terminal of the output buffer capacitor; and a converter circuit comprising a startup terminal for receiving a startup current, wherein said startup terminal is coupled to said first output terminal. Thus, said startup terminal will receive the startup current via the driven load, if the driven load is present to conduct this startup current.

In all of the above aspects, the present invention offers an advantage in that a relatively simple circuit is provided that prevents the start of the driver if no load is present or if such load is defective to provide an open circuit. The present invention further offers an advantage in that the overvoltage/open load protection does not make the driver burp. Preferably, the above mentioned method and driver are for LED application.

Further advantageous elaborations are mentioned in the dependent claims.

It shall be understood that a preferred embodiment of the invention, can also be any combination of the dependent claims or above embodiments with the respective independent claim.

BRIEF DESCRIPTION OF THE DRAWINGS

These and other aspects, features and advantages of the present invention will be farther explained by the following description of one or more preferred embodiments with reference to the drawings, in which same reference numerals indicate same or similar parts, and in which.

DETAILED DESCRIPTION OF EMBODIMENTS

Although the present invention relates to a driver for any type of load, the driver is especially useful for application as an LED driver, and hereinafter the present invention will be specifically explained and illustrated for the example of an LED load, without this example reducing the scope of the invention to LEDs.

Figure 1:
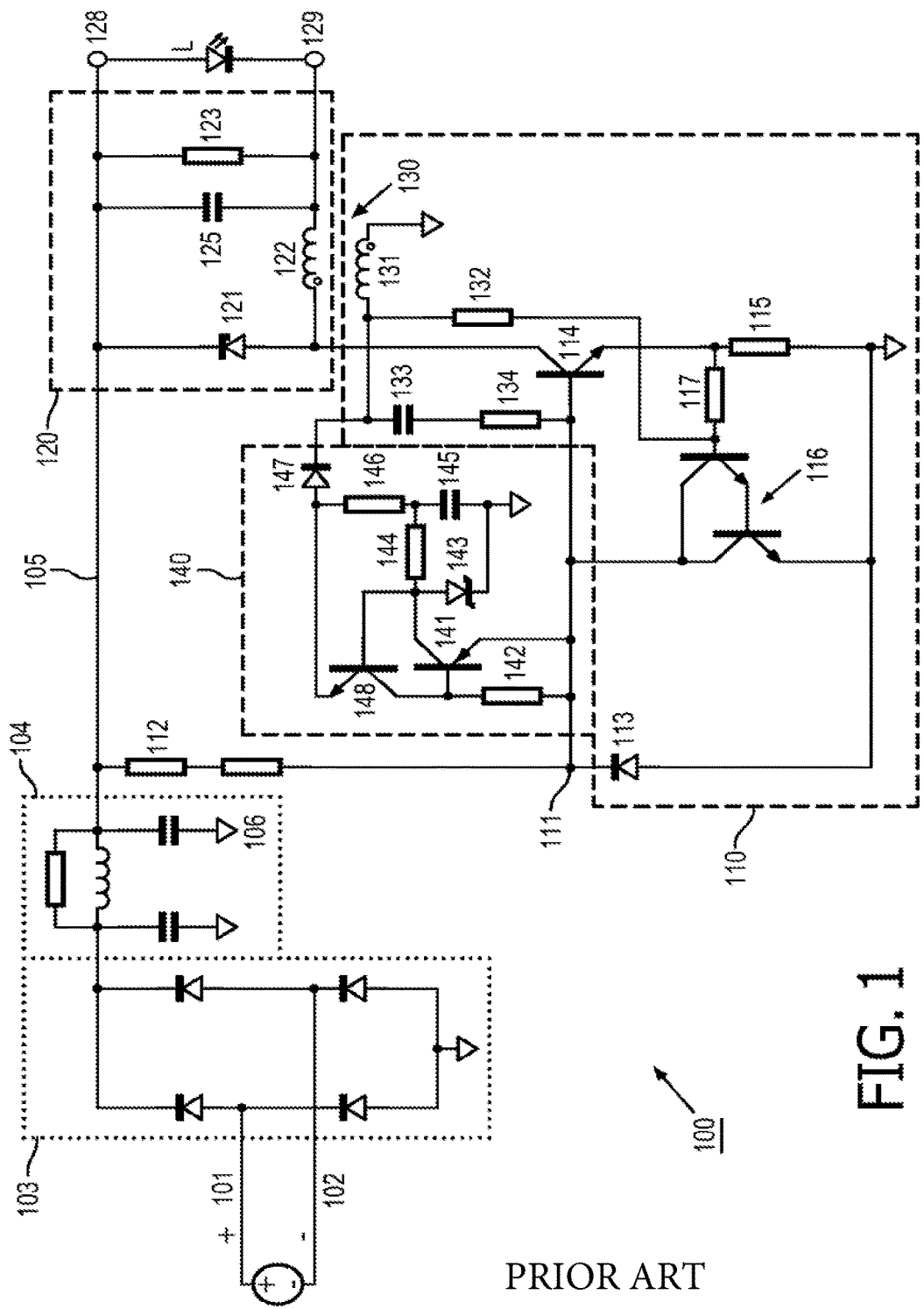
FIG. 1 schematically shows a circuit diagram of a prior art driver design.

FIG. 1 schematically shows a circuit diagram of a current driver 100 design. The driver 100 has input terminals 101, 102 for connecting to an AC mains, a rectifying stage 103 and an input filter stage 104. An output side of the input filter stage 104 connects to a positive voltage bus 105 and a negative or ground voltage bus 106. Block 110 is a converter circuit. It comprises a reference node 111 that is connected to the positive voltage bus 105 via a first resistor 112 and to the ground voltage bus 100 via a first diode 113, the cathode terminal of the first diode 113 being connected to the reference node 111.

In the converter circuit 110, a first NPN transistor 114 has its base terminal connected to the reference node 111, and has its emitter terminal connected to the ground voltage bus 106 via a current sensing resistor 115. A Darlington circuit 116, comprised of two NPN transistors, has its collector terminal connected to the reference node 111, has its emitter terminal connected to the ground voltage bus 106, and has its base terminal connected to the emitter terminal of the first NPN transistor 114 via a third resistor 117.

An output rectifying and filter stage 120 comprises a second diode 121 connected between the positive voltage bus 105 and the collector terminal of the first NPN transistor 114, the cathode terminal of the second diode 121 being connected to the positive voltage bus 105. A primary transformer winding 122 of a feedback transformer 130 has one terminal connected to the anode terminal of the second diode 121. A parallel arrangement of a fourth resistor 123 and an output buffer capacitor 125 is connected between the positive voltage bus 105 and a second terminal of the primary transformer winding 122.

A secondary transformer winding 131 of the feedback transformer 130 has one terminal connected to the ground voltage bus 106, and has a second terminal connected to the base terminal of the Darlington circuit 116 via a fifth resistor 132. A series arrangement of a second capacitor 133 and a sixth resistor 134 is connected between the second terminal of the secondary transformer winding 131 and the reference node 111.

The driver 100 has output terminals 128 and 129 connected to the positive voltage bus 105 and the second terminal of the primary transformer winding 122, respectively. The drawing shows a driven LED load L connected between these two output terminals 128, 129.

In case the driven LED is defective to provide an open circuit, or no LED is connected to the output terminals 128, 129, the voltage over the output buffer capacitor 125 may become very high, and thus the voltage over the output terminals 128, 129, may become very high, which is potentially dangerous and may cause damage to the electronic components.

To prevent this problem, the illustrated driver design includes an output overvoltage/open load protection circuit 140 connected between the refinance node 111 and the ground. As can be seen in the drawing, the output overvoltage/open bad protection circuit 140 comprises a PNP transistor 141 having its emitter terminal connected to the reference node 111, a resistor 142 connected between the reference node 111 and the base terminal of transistor 141, a Zener diode 143 connected between the ground voltage bus 106 and the collector terminal of transistor 141, a resistor 144 connected to the collector terminal of transistor 141, a capacitor 145 connected between the resistor 144 and the ground voltage bus 106, a resistor 146 connected to the node between capacitor 145 and resistor 144, a diode 14 connected, between the resistor 146 and the second, terminal of the secondary transformer winding 131, and an NPN transistor 148 having its base terminal connected to the collector terminal of transistor 141, having its collector terminal connected to the base terminal of transistor 141, and having its emitter terminal connected to the node between diode 147 and resistor 146. Thus, this output overvoltage protection circuit 140 requires eight components.

The operation principle of this open load protection is elucidated here. When the load L is open, output capacitor 125 will be charged to a high voltage. Via the coupled windings 122 and 131 of the feedback transformer 130, the capacitor 145 would be charged. When the voltage across the capacitor 145 exceeds the Zener voltage of the Zener diode 143, the Zener diode 143 is broken down. Then the transistor 148 and 141 are turned on, and pull the voltage at the node 111 to the ground, thereby turning off the first transistor 114. However, when the capacitor 145 discharges to a low level, it can not keep the transistors 148 and 141 on, thus the protection circuit 1401 stops front pulling the node 111 to the ground. The power bus 105 applies a starting voltage on the base of the transistor 114 again via the node 111, causing the transistor 114 to turn on again and the capacitor 125 is charged again. The above procedure repeats as long as the open load condition continues. Consequently, the protection circuit 140 periodically starts and stops, which is called "burping". This is not desirable for the driver.

Figure 2:
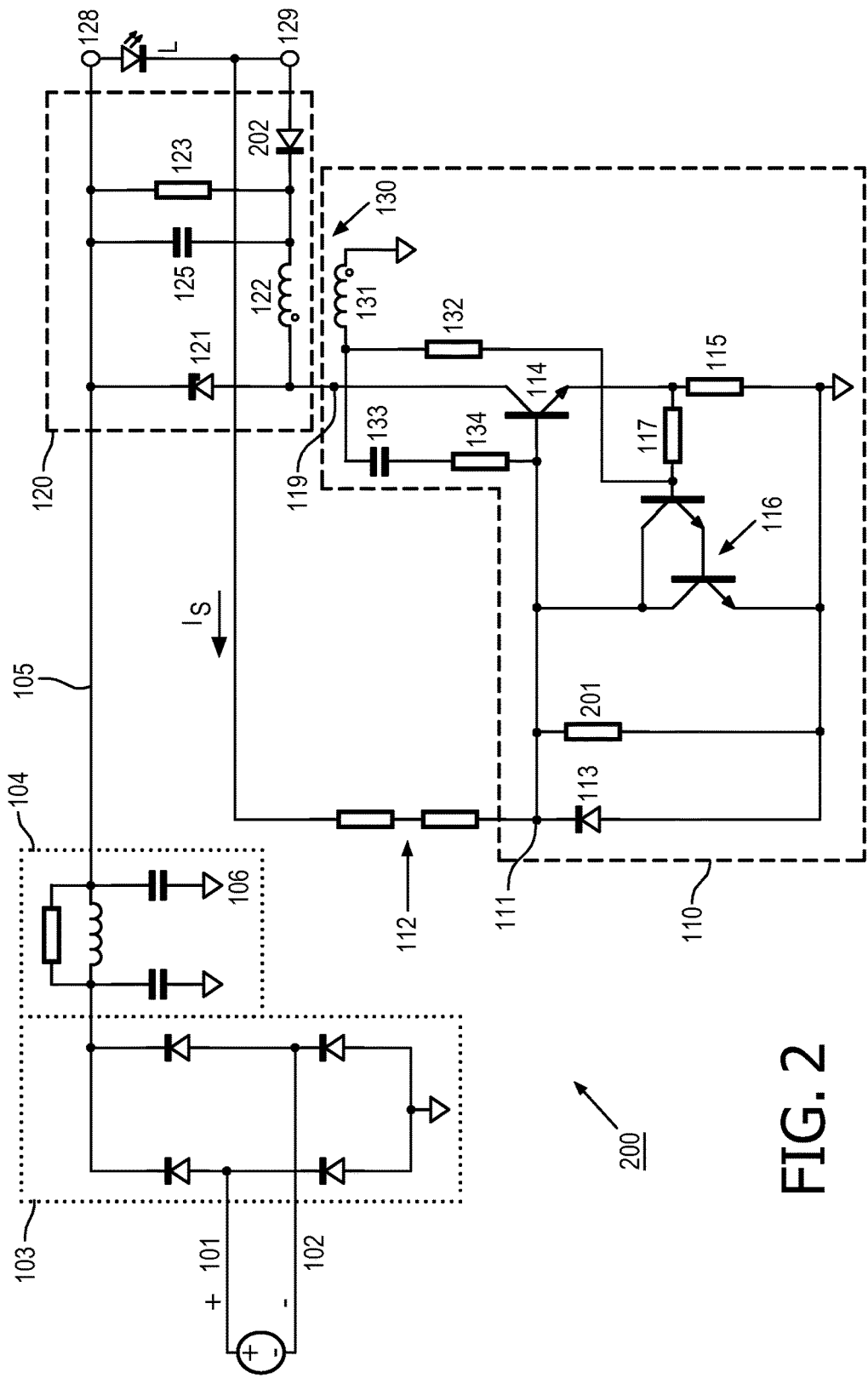
FIG. 2 schematically shows a circuit diagram of an embodiment Ma driver according to the present invention.

FIG. 2 schematically shows a circuit diagram of a driver 200 according to the present invention.

In a first implementation, the driver 200 comprises an output capacitor 125, two output terminals 128 and 129 coupled to the output capacitor 125 for coupling the load L, a coupling diode 202, in forward connection from one output terminal 129 to a terminal of the output capacitor 125, and a converter circuit 110 with a load terminal and a startup terminal 111, wherein said bad terminal being coupled to the one output terminal 129 via the coupling diode 202, for coupling the load L in loop with the power bus 105, and the startup terminal 111 is coupled to the one output terminal 129 to receive a startup current Is via the driven load L, if the driven load L is present to conduct this startup current.

In another embodiment, the driver 200 further comprises a load resistor 123, in parallel connection with the output capacitor 125.

Yet in another embodiment, the driver 200 further comprises a starting resistor 112 between the startup terminal 111 and the one output terminal 129. And said converter circuit 110 further comprises a switching element 114, for example a transistor 114 for selectively coupling the load L between the power bus 105 and the ground to form the close loop, and said startup current Is is for turning said transistor 114 on. It can be understood that other types of switching element, for instance MOSFET, are also applicable.

Figure 3:
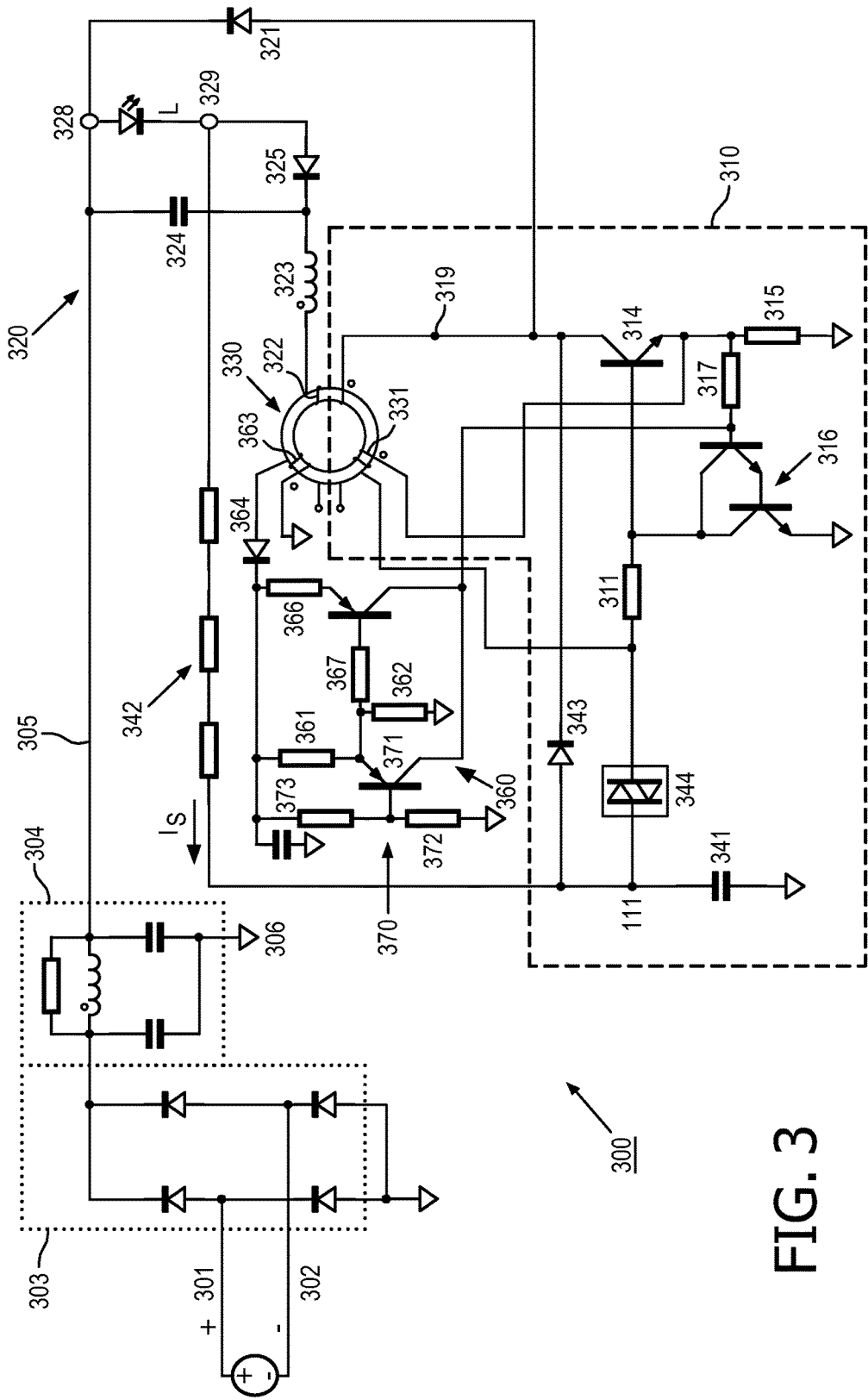
FIG. 3 schematically shows a circuit diagram of another embodiment of a driver according to the present invention.

There are many ways of using the startup current to turn on the transistor 114. FIG. 2 shows that the starting resistor 112 connects to a bias voltage node formed by a grounded resistor 201, The startup current would form a startup voltage across the ground resistor 201 to provide enough base voltage for the transistor 114 to make it start to be on. In another embodiment as shown in FIG. 3 which will be elucidated later, the startup, current is used for charging a startup capacitor to provide enough base voltage for the transistor.

The design of the LED driver 200 according to the present invention deviates from the driver 100 of FIG. 1 in the following features;

1) overvoltage protection circuit 140 has been eliminated;
2) first resistor 112, hereinafter also indicated as "starting resistor", connects to output terminal 129 instead of positive voltage bus 105;
3) a ground resistor 201 is connected in parallel to diode 113;
4) a coupling diode 202 is connected in forward form between output terminal 129 and the intersection of the fourth resistor 123, the output buffer capacitor 125 and the primary transformer winding 122.

It will be clear that the number of components is substantially lower than the prior art design, thus substantially reducing the costs. It is to be noted that the illustrated examples include an LED as the load of the driver, but the present invention is not limited to LED and other types of load, are also applicable.

The operation is as follows. In case an LED to be driven is present, the base terminal of first transistor 114 receives positive bias voltage from, the positive voltage bus 105 via the load LED L and the starting resistor 112, so that the converter circuit 110 is operating normal. Starting resistor 112 and ground resistor 201 operate as voltage divider for said bias voltage. When the voltage across resistor 201 exceeds Vbe of the first transistor 114, the first transistor 114 turns on and the LED L is coupled in a closed loop with the power has 105 and the ground. The current in the collector-emitter branch of the first transistor 114 develops a sensing voltage over the current sensing resistor 115, this sensing voltage being indicative of the load current, which sensing voltage is provided as an input voltage to the base terminal of the Darlington circuit 116. When the load current is high enough, the Darlington circuit 116 will turn on so that the base voltage of the first transistor 114 is lowered and the first transistor 114 is turned off. This operation is repeated thereby the LED is driven. Said first transistor 114 is the switching transistor of the switched-mode driver.

In cast there is no load LED L, the starting resistor 112 does not receive any positive voltage, with the coupling diode 202 also blocking current from the positive voltage bus 105 towards the starting resistor 112 through the capacitor 125 and through the resistor 123, and the base terminal of the first transistor 114 is pulled down to the voltage level of the ground voltage bus 106 by the ground resistor 201, which prevents the driver from starting. Thus, in an efficient manner, a high voltage at the output is prevented to develop. It is further noted that the coupling diode 202 prevents the output buffer capacitor 125 from discharging in the starting resistor 112.

Figure 4:
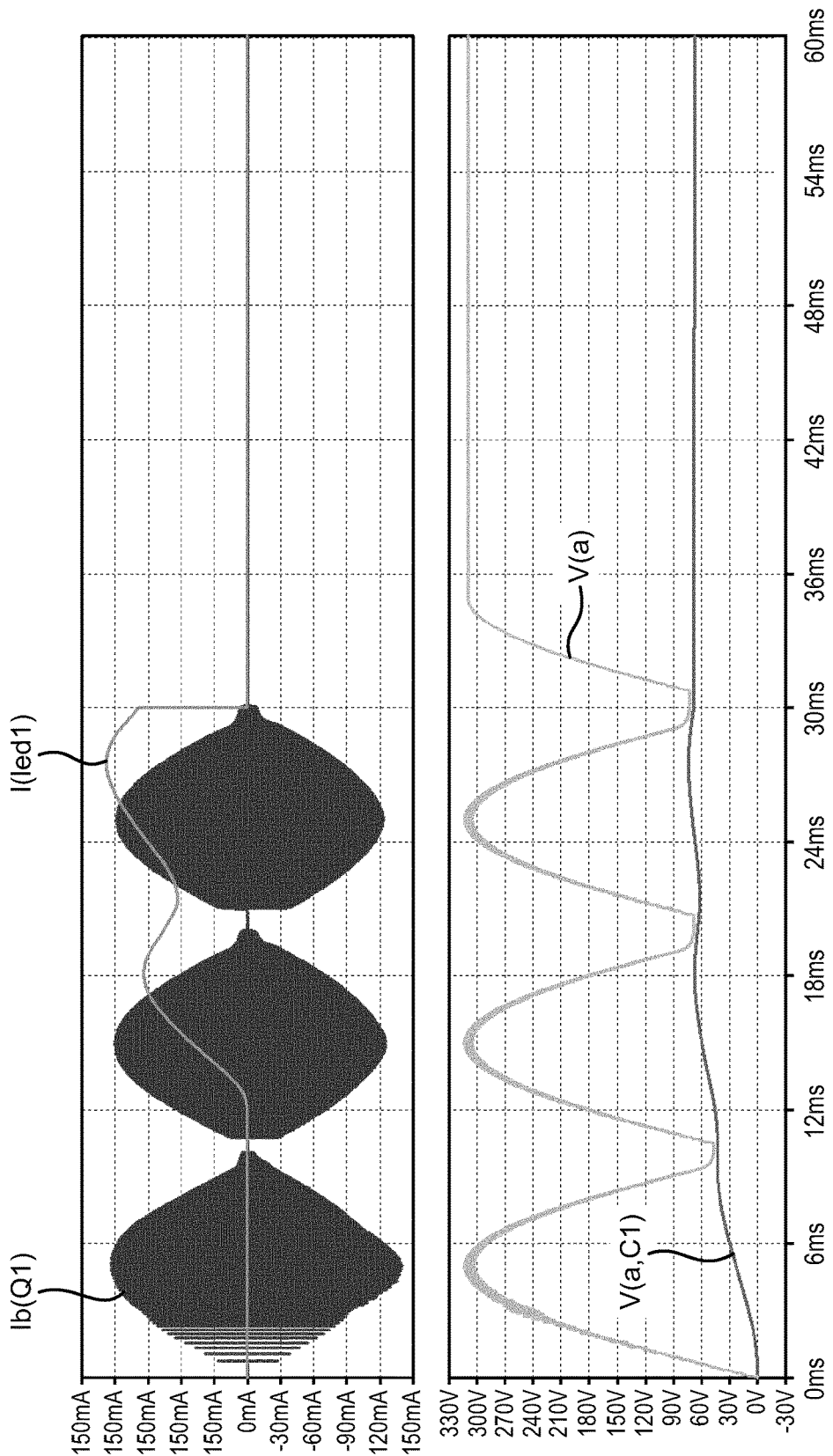
FIGS. 4 and 5 show graphs of current/voltage signals for illustrating the operation of the circuit as shown in FIG. 2.
Figure 5:
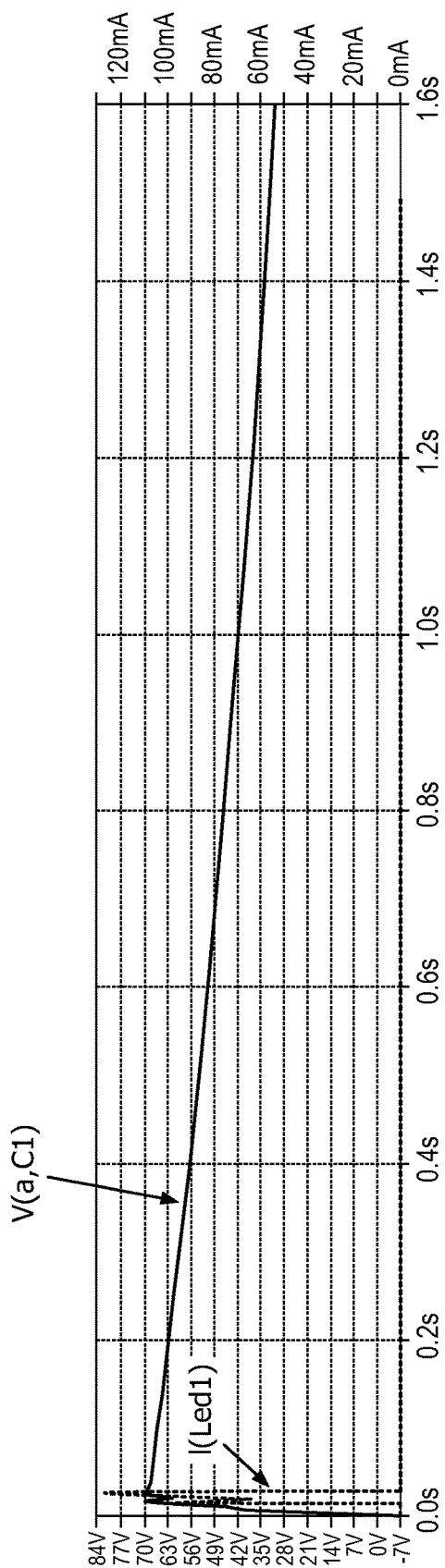

FIG. 4 and FIG. 5 illustrate current and voltage signals as a function of time in the driver 200 embodiment as shown in FIG. 2. More specifically, the upper graph of FIG. 4 shows the base current Ib(Q1) of the switching transistor 114 and the bad current I(Led1) in the LED L. At time 30 ms, the load is deliberately interrupted. As to the base current Ib(Q1), it can be seen that after the load is open, there is no burping/transient uprise which would occur due to the re-start of the protection circuit 140 in the driver as shown in FIG. 1. The lower graph of FIG. 4 shows the voltage V(a,C1): over the output buffer capacitor 125 and the voltage V(a) at the output terminal 128, i.e. at the positive bus 105. It can be seen that the voltage over the capacitor would not be charged to an over-high value. The graph of FIG. 3 shows the voltage V(a,C1) over the output buffer capacitor 125 and the load current I(Led1) in a long term. The load current comes to zero once the load is open, and the voltage over the output buffer the capacitor 125 decreases gradually.

FIG. 3 schematically shows a circuit diagram of a constant current LED driver 300 comprising a ring core transformer in accordance with the present invention.

The driver 300 has input terminals 301, 302 for connecting to an AC mains, a rectifying stage 303 and an input filter stage 304. An output side of the input filter stage 104 connects to a positive voltage bus 305 and a negative or ground voltage bus 306. Block 310 is a converter circuit. In the converter circuit 310, a first NPN transistor 314 has its base terminal connected to one terminal of a first resistor 311, and has its emitter terminal connected to the ground voltage bus 30b via a second resistor 315. A Darlington circuit 316, comprised of two NPN transistors, has its collector terminal connected to the base terminal of the first NPN transistor 314, has its emitter terminal connected, to the ground voltage bus 306, and has its base terminal connected to the emitter terminal of the first NPN transistor 314 via a third resistor 317. The first NPN transistor 314 is the switching transistor of the switched-mode driver 300.

An output rectifying and filter stage 320 comprises an output buffer capacitor 324 having one terminal connected to the positive voltage bus 305. A first diode 321 is connected between the positive voltage bus 305 and the collector terminal of the first NPN transistor 314, the cathode terminal of the first diode 321 being connected to the positive voltage bus 305. A primary transformer winding 322 of a feedback ring-core transformer 330 has one terminal connected to the anode terminal of the first diode 321. An inductor 323 is connected between a second terminal of the primary transformer winding 322 and the output buffer capacitor 324.

A second transformer winding 331 has one terminal connected to a second terminal of the first resistor 311, and has a second terminal connected to the emitter terminal of the first NPN transistor 314.

The driver 300 has a first output terminal 328 connected to the positive voltage bus 105 and a second output terminal 329 coupled to an intersection node between the output buffer capacitor 324 and the inductor 323 via a second diode 325, with the anode of the second diode 325 directed towards 202 the second output terminal 329. The drawing shows a driven LED L connected between the two output terminals 328, 329.

The driver 300 further comprises a storage capacitor 341 having one terminal connected to the ground voltage bus 306 and having its second terminal connected to the second output terminal 329 via a charging resistor 342, also indicated as "starting resistor". A third diode 343 connects the second terminal of the storage capacitor 341 to the collector terminal of the first transistor 314, with the anode of the third diode 343 being directed to the storage capacitor 341. A disc 344 connects the second terminal of the storage capacitor 341 to the second terminal of the first resistor 311.

The operation is as follows. In case an LED L to be driven is present, the Storage capacitor 341 is charged from the positive voltage bus 105 via the load LED L and the charging resistor 342. Once the voltage of the storage capacitor 341 reaches a threshold Value, the disc 344 will be triggered and provides base current to the first transistor 314, Which then will quickly discharge the storage capacitor 341 via the third diode 343, at the Same time drawing current in the primary transformer winding 322. This is repeated until the first transistor 314 operates in its saturation region. When the load current is big enough, the current sensing resistor 315 would provide a high voltage indicative of the load current to the Darlington circuit 316, which would lower the base voltage of the first transistor 314 and thus turn off the first transistor 314. This operation is repeated thereby the LED is driven.

In case there is no load LED L, the storage capacitor 341 will not be charged and the diac 344 will not fire, so that the first transistor 314 can not be brought into conductance and the driver 300 can not start. Thus, in an efficient manner, a high voltage at the output is prevented to develop.

In the driver 300 embodiment as shown in FIG. 3, since the feedback transformer 300 is implemented as a ringcore, it is desirable to have a constant load current. The voltage of the two transistors in the Darlington circuit 316 is 1.2V and the resistance of resistor 315 is constant, thus the current flowing through resistor 315 is constant.

Also, since a ringcore is used, temperature drift is a serious issue, lit order to solve or at least reduce this problem, the driver 300 is shown with a temperature compensation circuit 360, The temperature compensation circuit 360 comprises an NTC resistor 361, which has one terminal connected to ground 306 via a resistor 362, and which has its other terminal connected to the cathode of a diode 364 having its anode connected to a third transformer winding 363. A PNP transistor 365 has its emitter terminal connected to the cathode of the diode 364 via a resistor 366, has its base terminal connected to the node between the NTC resistor 361 and the resistor 362 via a resistor 367, and has its collector terminal connected to the base terminal of the Darlington circuit 316. The transistor 365 provides a bias current into the base terminal of the Darlington circuit 316. It is noted that an NTC resistor has a negative temperature coefficient, i.e. the resistance decreases with increasing temperature.

The operation of the temperature compensation circuit 360 is as follows. When the temperature increases, the Vbe of the Darlington circuit 316 drifts (decreases) and leads to an earlier OFF of the switching transistor 314, thereby decreasing the load current. On the other hand, as the temperature increases, the resistance of NTC resistor 361 decreases, causing the base voltage of transistor 365 to increase and hence the collector current of transistor 365 to decrease. Thus the bias current into the base terminal of the Darlington circuit 316 decreases, thus Darlington circuit 316 is turned. ON slower and hence the transistor 314 is turned OFF slower and more load current can be provided.

The driver 300 is further shown with an over-temperature protection circuit 370. The over-temperature protection circuit 370 comprises a PNP transistor 371 having Us emitter terminal connected to the node between the NTC resistor 361 and the resistor 362, having its collector terminal connected to foe base terminal of the Darlington circuit 316, and having its base terminal connected to ground bus 306 via a resistor 372 and to the cathode of the diode 364 via a resistor 373. A capacitor 374 is connected in parallel to the series arrangement of resistors 372 and 373.

The operation of the over-temperature protection circuit 370 is as follows.

As the temperature increases, the resistance of NTC resistor 361 decreases, causing the emitter voltage of transistor 371 to increase. When the temperature reaches a certain threshold value, the emitter-to-base voltage difference is higher than, 0.6V, and thus transistor 371 turns ON and produces a collector current which flows into the base of the Darlington circuit 316. This additional base current of the Darlington circuit 316 leads to an earlier cut-off of the switching transistor 314. Therefore, the LED bad is off and the power is limited, realizing over-temperature protection.

Summarizing, according to the present invention, parting current for a load driver for driving a load is provided via the load.

Further, according to the present invention, in a load driver for driving a load, an operating current or an operating voltage at a reference point is derived from a power voltage bus by coupling said reference point to said power voltage bus via the load.

Further, according to the present invention, a bad driver for driving a load comprises an output capacitor and two output terminals coupled, to the output capacitor. A coupling diode is coupled in forward connection from one output terminal to a terminal of the output buffer capacitor. A startup terminal of a converter circuit is coupled to said one output terminal to receive a startup current via the driven load if the load is present to conduct this current.

While the invention has been illustrated and described in detail in the drawings and foregoing description, it should be clear to a person skilled in the art that such illustration and description are to be considered illustrative or exemplary and not restrictive. The invention is not limited to the disclosed embodiment; rather, several variations and modifications are possible within the protective scope of the invention as defined in the appending claims. For instance, another type of controllable switch can be used instead of a switching transistor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Even if certain features am melted in different dependent claims, the present invention also relates to an embodiment comprising these features in common. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program, or a programmable device such as a microprocessor, microcontroller, digital signal processor, etc.

The invention claimed is:

1. Load driver for driving a load, said load driver being a switched-mode driver and comprising:
    an output buffer capacitor;
    two output terminals coupled to the output buffer capacitor for coupling to the load;
    a coupling diode coupled in a forward connection from a first output terminal of the two output terminals to a first terminal of the output buffer capacitor; and
    a converter circuit for outputting power through said two output terminals comprising:
        a startup terminal for receiving a startup current, wherein said startup terminal is coupled to said first output terminal; and
        a controllable switching element, wherein said startup terminal connects to a control terminal of the controllable switching element such that the control terminal of the controllable switching element is in series connection with the two output terminals, and said switching element is turned on by the startup current, wherein the startup current is from a second output terminal of the two output terminals, through the load, to the first output terminal, to the startup terminal and into the control terminal of the controllable switching element when the load is coupled to the two output terminals;
    wherein said coupling diode is adapted for blocking current from a positive voltage bus towards the control terminal of the controllable switching element when the load is not coupled to the two output terminals.

2. Load driver according to claim 1, wherein the output buffer capacitor is in parallel with a series connection of the two output terminals and the diode;
    and the startup terminal connects to the junction between the two output terminals and the diode.

3. Load driver according to claim 2, further comprising:
a load terminal coupled to said first terminal of the output buffer capacitor and to a cathode of the coupling diode;
wherein the controllable switching element is connected between said load terminal and a ground bus, the controllable switching element being for selectively coupling the load between the power bus and the ground bus to form a current loop;
wherein said startup current is for turning on said switching element.

4. Load driver according to claim 1, further comprising a starting resistor connected between the startup terminal and the first output terminal.

5. Load driver according to claim 1, wherein the converter circuit further comprises a first diode with an anode connected to the startup terminal and a cathode to a ground.

6. Load driver according to claim 1, wherein the converter circuit further comprises a storage capacitor coupled to the startup terminal, and wherein said startup current is for charging this storage capacitor to provide a startup voltage to the control terminal of the switching element.

7. Load driver according to claim 6, wherein the converter circuit further comprises a diac coupled between said storage capacitor and said control terminal of the switching element, to fire when the startup voltage of said storage capacitor has reached a threshold voltage.

8. Load driver according to claim 7, wherein the switching element comprises a switching transistor which couples the load between the positive voltage bus and a ground, and said diac is coupled to the base of the switching transistor.

9. Load driver according to claim 8 wherein a collector terminal of said switching transistor is coupled to said load terminal.

10. Load driver according to claim 3, wherein said load terminal is coupled to said first terminal of the output buffer capacitor via a primary winding of a feedback transformer.

11. Load driver according to claim 1, further comprising a load resistor, in parallel connection with the output buffer capacitor, and the switching element comprising a MOSFET.

12. Load driver according to claim 8, wherein the switching transistor is a bipolar junction transistor, and the load driver further comprises:
a current sensing resistor, between an emitter terminal of the switching transistor and the ground; and
a Darlington circuit, comprised of two NPN transistors, with a collector terminal connected to the startup terminal, an emitter terminal connected to the ground, and a base terminal connected to the emitter terminal of the switching transistor via a third resistor.

13. A LED lighting device, comprising:
a load driver according to claim 1; and
one LED load driven by said load driver.

* * * * *